(12) United States Patent
Laskawiec

(10) Patent No.: US 12,175,262 B2
(45) Date of Patent: *Dec. 24, 2024

(54) TESTING AND SELECTION OF EFFICIENT APPLICATION CONFIGURATIONS

(71) Applicant: Red Hat, Inc., Raleigh, NC (US)

(72) Inventor: Sebastian Laskawiec, Lipniki (PL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,597

(22) Filed: Aug. 14, 2023

(65) Prior Publication Data

US 2023/0385074 A1 Nov. 30, 2023

Related U.S. Application Data

(63) Continuation of application No. 16/802,127, filed on Feb. 26, 2020, now Pat. No. 11,762,670.

(51) Int. Cl.
*G06F 1/24* (2006.01)
*G06F 9/00* (2018.01)
*G06F 9/445* (2018.01)
*G06N 20/00* (2019.01)

(52) U.S. Cl.
CPC ........... *G06F 9/4451* (2013.01); *G06N 20/00* (2019.01)

(58) Field of Classification Search
CPC ............... G06F 9/4451; G06N 20/00
See application file for complete search history.

(56) References Cited

U.S. PATENT DOCUMENTS

| 7,272,707 B2 | 9/2007 | Liu et al. |
| 8,898,096 B2 | 11/2014 | Caves et al. |
| 9,886,262 B2 | 2/2018 | Thomas et al. |
| 10,554,817 B1* | 2/2020 | Sullivan ............... H04L 41/5054 |
| 10,978,179 B2 | 4/2021 | Beltre |
| 11,514,184 B1 | 11/2022 | Wilton |
| 11,908,066 B2* | 2/2024 | Barreiro ................ G06T 15/506 |
| 2019/0102098 A1* | 4/2019 | Biswas ................. G06F 3/0629 |

(Continued)

FOREIGN PATENT DOCUMENTS

| CA | 2501729 | 4/2015 |
| WO | 2019150222 | 8/2019 |

OTHER PUBLICATIONS

Siemens updates NX Software with Artificial Intelligence and Machine Learning to increase productivity; https://www.olm.automation.siemens.com/global/en/our-story/newsroom/siemens-updates-nx-artificial-intelligence-machine-learning-productivity/57346; Retrieved Oct. 31, 2019; Feb. 18, 2019 (3 pages).

*Primary Examiner* — Mohammed H Rehman
(74) *Attorney, Agent, or Firm* — Kilpatrick Townsend & Stockton LLP

(57) ABSTRACT

Methods and systems for selecting, testing, and applying application configurations are presented. In one embodiment, a method is provided that includes executing an application according to a first configuration and measuring a first plurality of metrics. One or more changes to a plurality of configuration settings of the first configuration may be identified by a machine learning model to generate one or more new configurations. Among the one or more new configurations, a second configuration for future executions of the application may be selected based on the first plurality of metrics and a second plurality of metrics associated with an execution of the application.

20 Claims, 7 Drawing Sheets

(56) References Cited

U.S. PATENT DOCUMENTS

| | | | |
|---|---|---|---|
| 2019/0171950 A1 | 6/2019 | Srivastava | |
| 2019/0278928 A1* | 9/2019 | Rungta | G06F 9/5077 |
| 2019/0319978 A1* | 10/2019 | Giffard | G06F 16/2255 |
| 2020/0125545 A1 | 4/2020 | Idicula et al. | |
| 2020/0195571 A1* | 6/2020 | Srinivasan | H04L 67/1097 |
| 2020/0232901 A1* | 7/2020 | Sanchez-Martin | G06F 30/27 |
| 2020/0356462 A1 | 11/2020 | Anand | |
| 2020/0387602 A1* | 12/2020 | Kursun | G06F 21/554 |
| 2020/0389454 A1 | 12/2020 | Gulnac | |
| 2021/0297461 A1 | 9/2021 | Athwal | |

* cited by examiner

TESTING AND SELECTION OF EFFICIENT APPLICATION CONFIGURATIONS

CROSS-REFERENCE TO RELATED APPLICATIONS

This application is a continuation of U.S. patent application Ser. No. 16/802,127, entitled "TESTING AND SELECTION OF EFFICIENT APPLICATION CONFIGURATIONS," filed Feb. 26, 2020, the entire contents of which are incorporated herein by reference herein and relied upon.

BACKGROUND

Applications may execute in computing environments, such as distributed computing environments. Applications that execute in such computing environments may support multiple configurations that adjust the operation of the applications based on one or more factors. Certain configurations may operate better under certain types of conditions, while other configurations may operate better under different types of conditions.

SUMMARY

The present disclosure presents new and innovative systems and methods for testing and selecting efficient application configurations. In one embodiment, a method is provided that includes executing an application according to a first configuration. The first configuration may include a plurality of configuration settings. The method may also include measuring a first plurality of metrics regarding the execution of the application according to the first configuration and identifying, with a machine learning model, a change to at least one configuration setting to generate a second configuration. The application may be executed according to the second configuration and a second plurality of metrics may be measured regarding execution of the application according to the second configuration. A selected configuration for future executions of the application may be selected from among the first and second configurations based on the first plurality of metrics and the second plurality of metrics.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

In certain instances, users may execute applications on computing environments (e.g., cloud computing environments) provided and configured by another entity (e.g., a cloud computing provider). For example, users may execute applications in a cloud computing environment implemented by a third party and configured and accessed according to the Red Hat® OpenShift® and/or Kubernetes® protocols. Conditions within such computing environments may vary, which may change the configurations required for applications to execute properly and/or efficiently. It may therefore be unduly burdensome for users to configure applications properly and to update configurations in response to changes in the current conditions within the computing environments. Furthermore, applications that are incorrectly configured may utilize excessive computing resources within the computing environment and/or may not properly execute to fulfill expected functions. For example, an application may be configured to execute with too many instances for its workload, and the additional instances may unnecessarily utilize computing resources (e.g., processing cores and/or memory capacity) within the computing environment (e.g., on a cluster or clusters executing the application). As another example, an application may be migrated from one computing environment to a new computing environment (e.g., from a first set of clusters to a second set of clusters). The new computing environment may have different computing resources and may therefore necessitate a different configuration.

Therefore, it may be necessary to identify when an application executing within a computing environment has been incorrectly configured. One solution to this problem is to initially execute an application according to an initial configuration within a computing environment. The application may be executed for a time according to the initial configuration and initial execution parameters may be collected. The machine learning model may then identify a change to the initial configuration to generate a second configuration. The application may be executed according to the second configuration and second execution metrics may be collected. This process may or may not be repeated multiple times. The model may then compare the execution metrics and may select one of the configurations for use in future executions of the application.

Figure 1A:
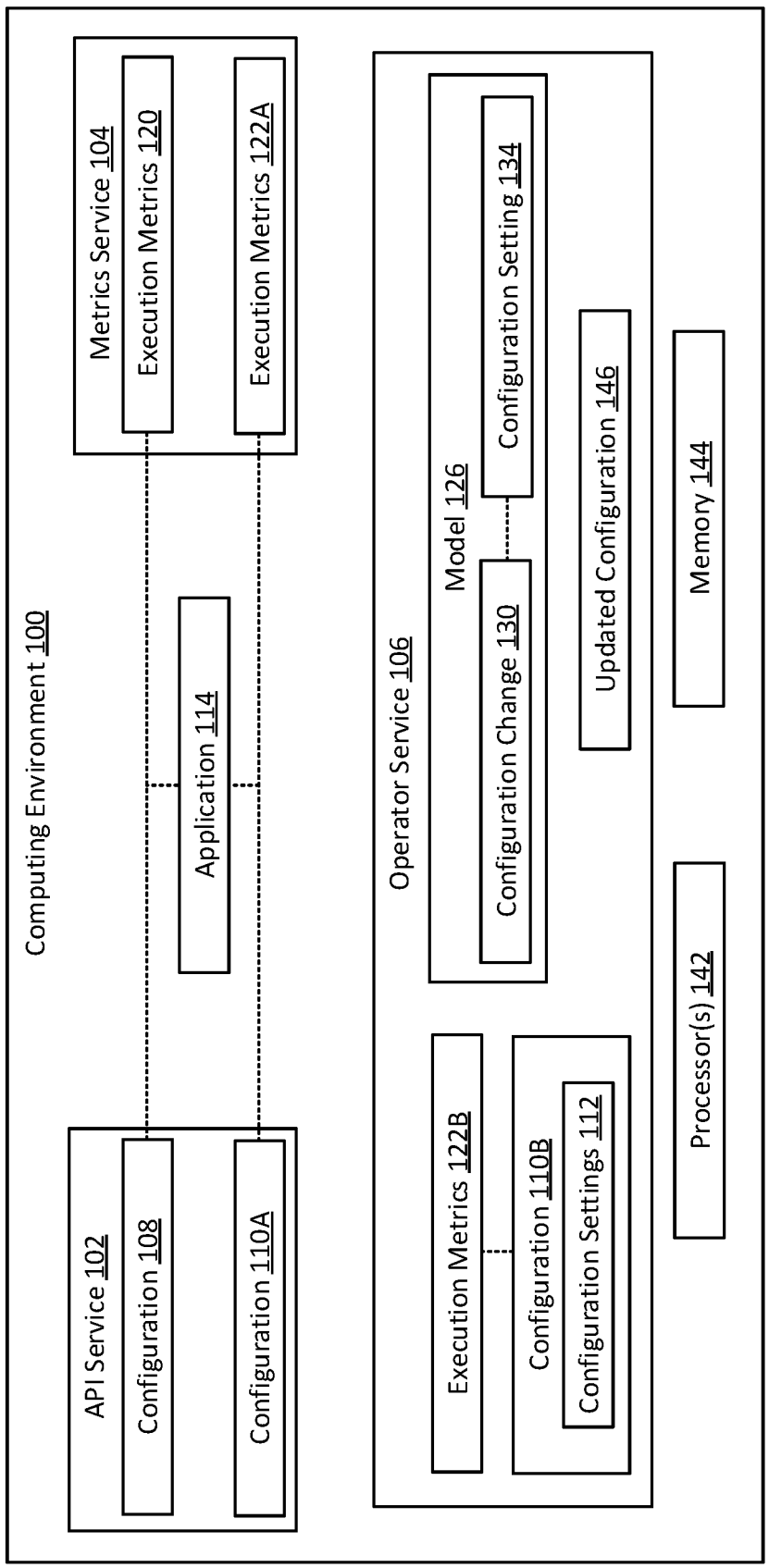
FIG. 1A illustrates a computing environment for identifying and selecting efficient application configurations according to an exemplary embodiment of the present disclosure.

FIG. 1A illustrates a computing environment 100 for identifying and selecting efficient application configurations according to an exemplary embodiment of the present disclosure. The computing environment 100 may be configured to execute applications 114. In particular, the computing environment 100 includes processor(s) 142 and a memory 144, which may be utilized to execute the applications 114. For example, one or more cores of the processor(s) 142 and particular segments or amounts of the memory 144 may be allocated to applications 114 for execution. In certain implementations, the computing environment 100 is an exemplary implementation of all or part of a cloud computing environment (e.g., a cluster of a Kubernetes® cloud environment) or other distributed computing environment. For example, the computing environment 100 may be configured to execute applications on behalf of entities different from an entity implementing the computing environment 100. The applications 114 may execute to perform different functions. For example, the application 114 may be executing as a data grid providing access and/or storage of data to other users, including users external to the computing environment 100. As another example, other applications may execute to provide data synchronization between multiple computing clients. As a further example, other applications may execute to provide a send/receive buffer (e.g., for sending/receiving data) for other applications.

Each application 114 may have one or more associated configuration 108, 110A and/or execution metrics 120, 122A. The configurations 108, 110A may be applied by an application programming interface (API) service 102. The API service 102 may be configured to interface with applications 114 in order to ensure that the applications 114 execute according to the configurations 108, 110A. Specifics regarding application configurations are discussed in greater detail below in connection with FIG. 2.

The execution metrics 120, 122A may specify information regarding performance of the application 114. The execution metrics 120, 122A may be collected by a metrics service 104 of the computing environment 100. For example, the metrics service 104 may be configured to interface with the application 114 and/or portions of the computing environment 100 (e.g., networking interfaces/services, resource utilization monitors) to determine the operating conditions of the application 114 and to store the operating conditions (e.g., operating conditions over time) as execution metrics 120, 122A. The execution metrics 120, 122A may be collected on a regular basis, such as, e.g., every second, every 15 seconds, every minute, every five minutes, every 10 minutes. The execution metrics 120, 122A may provide average performance measures over a period of time, such as a rolling period of time (e.g., the last 10 seconds, the last minute, the last 10 minutes) or for a period of time with a fixed starting point (e.g., since execution of the application 114 began). The execution metrics 120, 122A may differ depending on the type of application 114. For example, for an application 114 executing to provide a data grid, the execution metrics 120 may specify a request throughput reflecting an average rate at which requests are received for the data grid, a request latency reflecting average response time to the received requests, and an average startup time for instances of the application 114. As another example, for an application providing data synchronization, the execution metrics may specify an amount of data transferred, times at which data is transferred, and data transfer latency indicating an average time it takes for data updated on one computing client to be updated on another computing client. As a further example, for applications executing to provide a send/receive buffer, the execution metrics may include one or more of a request throughput, request latency, and average buffer utilization indicating an average amount of buffer space utilized during execution. Additionally or alternatively, the execution metrics 120, 122A may indicate measures of resource utilization by the application 114. For example, the execution metrics 120, 122A may indicate an amount of processing power (e.g., number of processing cores, an overall processor utilization) utilized, an amount of memory utilized, an amount of bandwidth utilized, and an amount of storage space utilized. In light of the present disclosure, additional or alternative execution metrics to the discussed above may be apparent to those skilled in the art. All such execution metrics are presently contemplated and considered within the scope of the present disclosure.

The operator service 106 may be configured to analyze configurations 110B of applications 114 executing within the computing environment 100 and to identify updated configurations 146 for the applications 114. For example, the operator service 106 may receive the execution metrics 122B and the configuration 110B of the application 114 and may identify an updated configuration 146 for the application 114. The operator service 106 includes a model 126 (e.g., a machine learning model), which may be configured to identify a configuration change 130. For example, the configuration change 130 may include a change to one or more configuration settings 134. In particular, the configuration 110B includes configurations settings 112, which may specify one or more parameters of the configurations. For example, and as explained further below in connection with FIG. 2, the configuration 110B may include one or more implementation details and required system resources, and the configuration settings may specify one or more parameters of the implementation details and/or required system resources. The configuration change 130 may be identified as a change to one or more of the configurations settings 112 of the configuration 110B. In particular, the configuration setting 134 may be an updated setting (e.g., an updated setting value) for at least one of the configuration settings 112. Based on the configuration change 130 identified by the model 126, the operator service 106 may generate an updated configuration 146. For example, the updated configuration 146 may be generated by incorporating the configuration setting 134 into the configuration 110B.

The operator service 106 may be configured to identify multiple updated configurations for the application 114. For example, after the updated configuration 146 is identified, the application 114 may be executed according to the updated configuration 146 and execution metrics corresponding to the updated configuration 146 may be collected. The operator service 106 may then identify another configuration change and another updated configuration based on the execution metrics. In this way, the computing environment 100 and the operator service 106 may be configured to generate multiple configurations for the application 114 and to execute the applications according to the configurations to collect execution metrics 120, 122. The computing environment 100 and/or operator service 106 may then select between the multiple configurations to identify a selected configuration to be used for future executions of the application 114 (e.g., future executions of the application 114 within the computing environment 100 or in other computing environments). For example, the selected configuration may be selected from among the multiple configurations based on the execution metrics 120, 122A associated with the multiple configurations.

In certain implementations, the operator service 106 may include different models 126 for different applications within the computing environment 100. For example, in certain implementations, the operator service 106 may have a separate model 126 for each application. Additionally or alternatively, the computing environment 100 may have different operator services 106 with different models 126 for different types of applications (e.g., a model for data grid applications, a model for read/write buffer application).

The computing environment 100 may be implemented by one or more computing devices, such as server computers, laptop computers, personal computers, virtual machines, smartphones, tablets, wearable computing devices, or any other suitable computing device. Additionally, the processor(s) 142 and memory 144 may be configured to implement one or more operational features of the computing environment 100. For example, memory 144 may store instructions which when executed by one or more of the processor(s) 142, may cause the processor(s) 142 to execute one or more operational features of the computing environment 100.

Figure 1B:
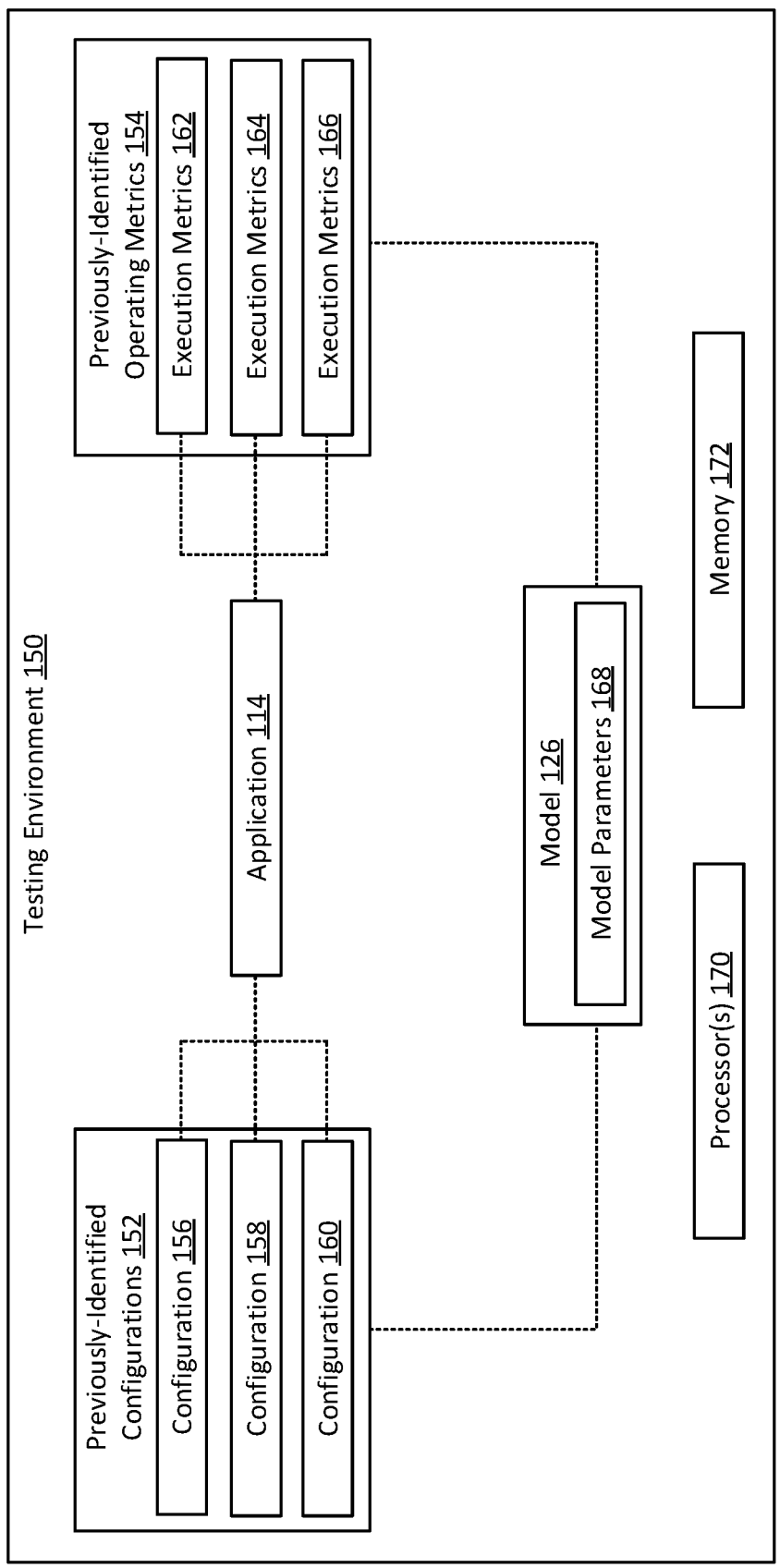
FIG. 1B illustrates a testing environment for application validation according to an exemplary embodiment of the present disclosure.

FIG. 1B illustrates a testing environment 150 for application validation according to an exemplary embodiment of the present disclosure. The testing environment 150 may be configured to test applications prior to deployment in computing environments 100 (e.g., cloud computing environments). For example, the testing environment 150 as depicted may be testing the application 114 prior to deployment in the computing environment 100. The testing environment 150 may test the application 114 according to previously-identified configurations 152, which may be predefined. The previously-identified configurations 152 include multiple configurations 156, 158, 160, which may specify particular configurations for the application 114. In particular, the configurations 156, 158, 160 may include information similar to the configurations 108, 110A discussed above.

The testing environment 150 includes previously-identified operating metrics 154. The previously-identified operating metrics 154 include multiple execution metrics 162, 164, 166. The execution metrics 162, 164, 166 may include information regarding performance of the application 114. For example, the execution metrics 162, 164, 166 may include information regarding, e.g., response latency, computing resource utilization, and/or any of the metrics discussed above in connection with the execution metrics 120, 122A. The execution metrics 162, 164, 166 may also include information regarding the operating conditions and/or workloads that the application 114 operates under during testing. For example, the execution metrics 162, 164, 166 may specify, e.g., a number of requests the application 114 receives during testing, an amount of data for transfer during a test, an amount of available bandwidth, or other system resources.

The configurations 156, 158, 160 may include configurations 156, 158, 160 optimized for performance under heavy loads for the application 114 and configurations 156, 158, 160 optimized for minimal resource utilization during execution of the application 114. The application 114 may be tested multiple times based on the configurations 156, 158, 160 and the execution metrics 162, 164, 166. For example, each configuration 156, 158, 160 may be executed according to one or more of the execution metrics 162, 164, 166. For example, each of the execution metrics 162, 164, 166 may include one or more corresponding configurations 156, 158, 160 for testing. Alternatively, each of the configurations 156, 158, 160 may include one or more execution metrics 162, 164, 166 for which testing should be performed. To test the application 114, the testing environment 150 may execute the application 114 according to a particular configuration 156, 158, 160 and may record the resulting performance in the execution metrics 162, 164, 166.

The previously-identified configurations 152 and previously-identified operating metrics 154 may be used to train the model 126 for subsequent use in the computing environment 100. For example, if the application 114 meets performance requirements according to the performed tests, the application 114 may be deployed (e.g., for production use) to computing environments such as the computing environment 100. When deploying the application 114, the testing environment 150 may also deploy the model 126 for use in updating configurations of the application 114. In certain implementations, the model 126 may be implemented as a machine learning model configured to analyze received execution metrics 122B and configurations 110B to identify a potential change to one or more configuration settings. In particular, the model may be implemented as a neural network model, such as a recurrent neural network, a convolutional neural network, and a deep learning neural network. In additional or alternative implementations, the model 126 may be implemented as a classifier model, such as one or more of a decision tree classifier, logistic regression classifier, nearest neighbor classifier, neural network classifier, support vector machine, and a naïve Bayes classifier.

The model 126 may be trained based on at least a subset of the previously-identified configurations 152 and the previously-identified operating metrics 154. For example, the previously-identified configurations 152 and/or previously-identified operating metrics 154 may include one or more training sets of configurations and execution metrics that may be used to train the model 126. For example, the previously-identified configurations 152 may include different types of configurations with different values for various configurations settings for the application 114. The model 126 may analyze the training sets to predict the corresponding configuration change 130. For example, based on the previously-identified configurations 152 and the corresponding previously-identified operating metrics 154, the model 126 may identify one or more settings that are associated with different types of configurations (e.g., one or more configuration settings associated with improved/worsened performance under heavy loads, one or more configuration settings associated with reduced/increased resource utilization, one or more configuration settings associated with improved/worsened communication latency). Based on the training, model parameters 168 of the model 126 may be updated to reflect particular associations between configuration settings and the different types of configurations. In particular, the model parameters 168 may include weights (e.g., priorities) for different features and combinations of features (e.g., configuration settings and execution metrics) and updating the model 126 may include updating one or more of the features analyzed and the weights assigned to different features and/or combinations of features. After being trained, the model 126 may be deployed to computing environments, such as the computing environment 100 (e.g., may be deployed in combination with the application 114).

The testing environment 150 may be implemented by one or more computing devices, such as server computers, laptop computers, personal computers, virtual machines, smartphones, tablets, wearable computing devices, or any other suitable computing device. Additionally, the processor(s) 170 and memory 172 may be configured to implement one or more operational features of the testing environment 150. For example, memory 172 may store instructions which when executed by one or more of the processor(s) 170, may cause the processor(s) 170 to execute one or more operational features of the testing environment 150.

Figure 2:
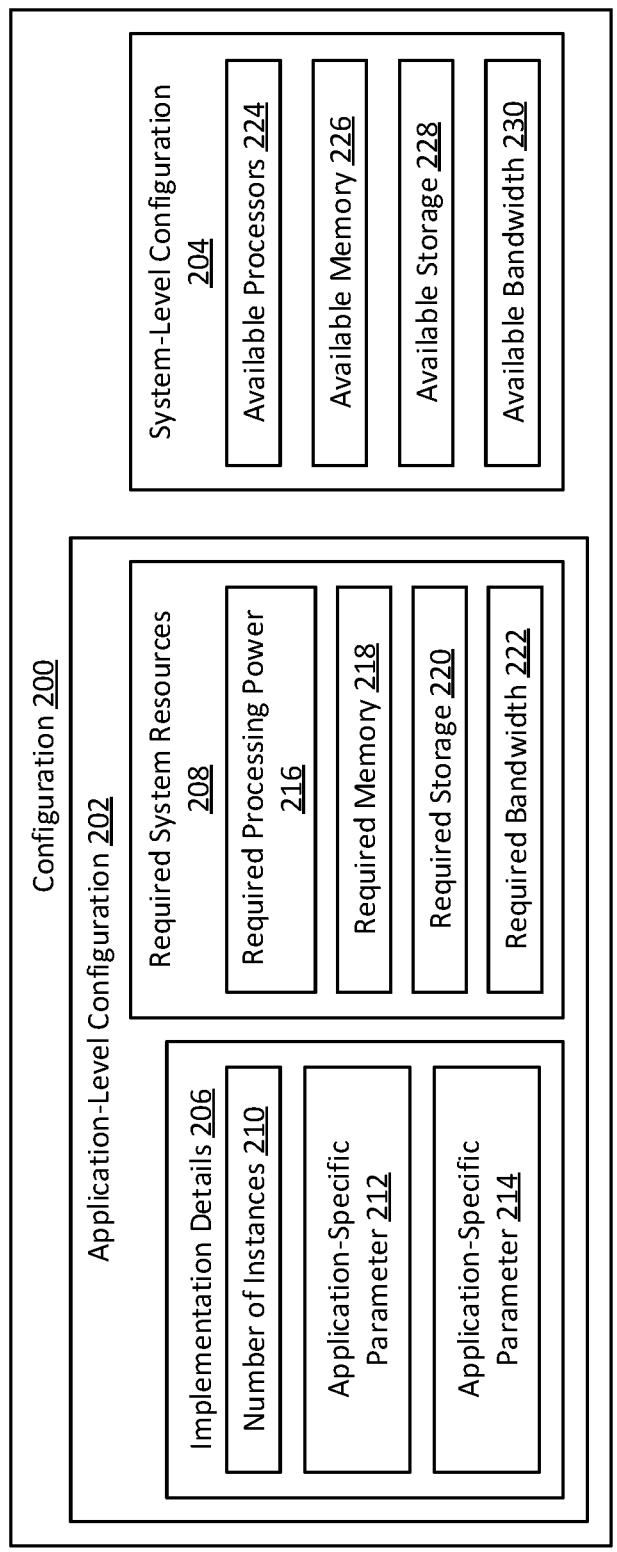
FIG. 2 illustrates a configuration according to an exemplary embodiment of the present disclosure.

FIG. 2 illustrates a configuration 200 according to an exemplary embodiment of the present disclosure. The configuration 200 may be an exemplary implementation of configurations used by the computing environment 100 and/or the training environment 150. For example, the configuration 200 may be an exemplary implementation of the configurations 108, 110A, 156, 158, 160 and/or the configuration change 130. The configuration 200 includes an application-level configuration 202 and a system-level configuration 204. In certain implementations, the configuration 200 may be implemented as a data structure storing the application-level configuration 202 and/or the system-level configuration 204. For example, the configuration 200 may be stored as one or more of an extended markup language (XML) file, a Kubernetes® ConfigMap data structure, a YAML file, and/or a JavaScript Object Notation (JSON) file.

The application-level configuration 202 may specify particular options and/or parameters specific to particular implementations of applications 114 (e.g., may specify how the application 114 executes within the computing environment 100). For example, the application-level configuration 202 may include implementation details 206 that specify particular implementation options and/or parameters for the applications 114. As a specific example, the implementation details 206 may include a number of instances 210 specifying a number of instances of the application 114 that should execute within the computing environment 100. For example, certain applications 114 may be capable of executing as one or more instances executing in parallel (e.g., instances executing within separate containers and/or virtual machines of the computing environment 100), and the number of instances 210 may specify one or more of a required number of instances, minimum number of instances, and/or maximum number of instances for the application 114. The implementation details 206 may also include one or more application-specific parameters 212, 214. The application specific parameters 212, 214 may specify one or more parameters or options that configure how the particular application 114 executes within the computing environment 100. The specific types of application-specific parameters 212, 214 may differ depending on the specific type of application. For example, for an application 114 executing to provide a data grid, the application-specific parameters 212, 214 may include one or more of a number of instances of the data grid, a communication protocol, a buffer size, initial members expected when detecting members of the data grid, a request timeout period specifying the maximum number of time to wait when detecting members of the data grid, a member discovery protocol specifying the type of communication protocol members of the data grid utilized to communicate, a storage configuration specifying a type of formatting and/or a storage protocol used to store data within the data grid, a duplication protocol specifying whether and how data is duplicated across multiple members of the data grid, and/or a maximum size of files and/or partial files stored on the data grid. As another example, for an application providing data synchronization, the application-specific parameters 212, 214 may specify one or more of an update frequency uploading and/or downloading synchronized data, a maximum data size for files or partial files synchronized between clients, a preferred data transfer speed, a data storage format, and/or a maximum number of clients per synchronization operation. As a still further example, for an application executing to provide a send/receive buffer, the application-specific parameters 212, 214 may specify one or more of a number of buffers to be implemented by each instance of the application, a storage capacity for each buffer, a maximum or minimum payload size for the buffers, and/or an uptime for instances of the application.

Additionally or alternatively, the application-level configuration 202 may identify required system resources 208 indicating amounts of resources needed to execute the application 114 and/or to execute instances of the application 114 within the computing environment 100. For example, the required system resources 208 may specify a required processing power 216, (e.g., a minimum number of processing cores, maximum number of processing cores) and/or required memory 218 (e.g., a minimum memory capacity required, a maximum memory capacity required, a type of memory required). The required system resources 208 may additionally or alternatively include required storage 220 (e.g., a minimum amount of storage space required, a maximum amount of storage space required, a particular type of storage space required, a storage data transfer speed required) and/or a required bandwidth 222 (e.g., a minimum of network bandwidth required, a maximum amount of network bandwidth required, a particular network communication interface required). The required resources 208 may be specified for the application 114 overall and/or may specify the resources required for individual instances of the application 114.

The system-level configuration 204 may specify an amount of one or more system resources available for execution of applications 114. For example, the system-level configuration 204 may specify the amount of one or more system resources available within the computing environment 100 (e.g., available within the cluster in which the application 114 is executing). As a specific example, the system-level configuration 204 may specify one or more of available processors 224 (e.g., available processing cores), available memory 226 (e.g., available memory capacity and/or available memory speed), available storage 228 (e.g., available storage capacity and/or available storage transfer speed), and/or available bandwidth 230 (e.g., available bandwidth transfer capacity). In certain implementations, the system-level configuration 204 may specify a total amount of system resources available. Additionally or alternatively, the system-level configuration 204 may specify an amount of system resources that are available and are not allocated for use with other system functions (e.g., other applications). For example, one or more applications may reserve access to particular system resources (e.g., particular processing cores and/or particular capacities of memory), but may not be currently using the reserve computing resources to execute. In such instances, the system-level configuration 204 may omit such reserved computing resources from indications of the available system resources.

It should be understood that certain implementations of the configuration 200 may differ from those depicted in FIG. 2. For example, certain implementations of the configuration 200 may lack one or more of the implementation details 206, the required system resources, and the system level configuration 204. Additionally or alternatively, certain implementations of the required system resources 208, the implementation details 206, and/or the system-level configuration 204 may omit one or more of the depicted pieces of information and/or may include additional pieces of information. For example, the required system resources 208 and/or the system-level configuration 204 may include information regarding additional types of system resources to those depicted and/or may exclude information regarding one or more of the depicted types of system resources.

Figure 3A:
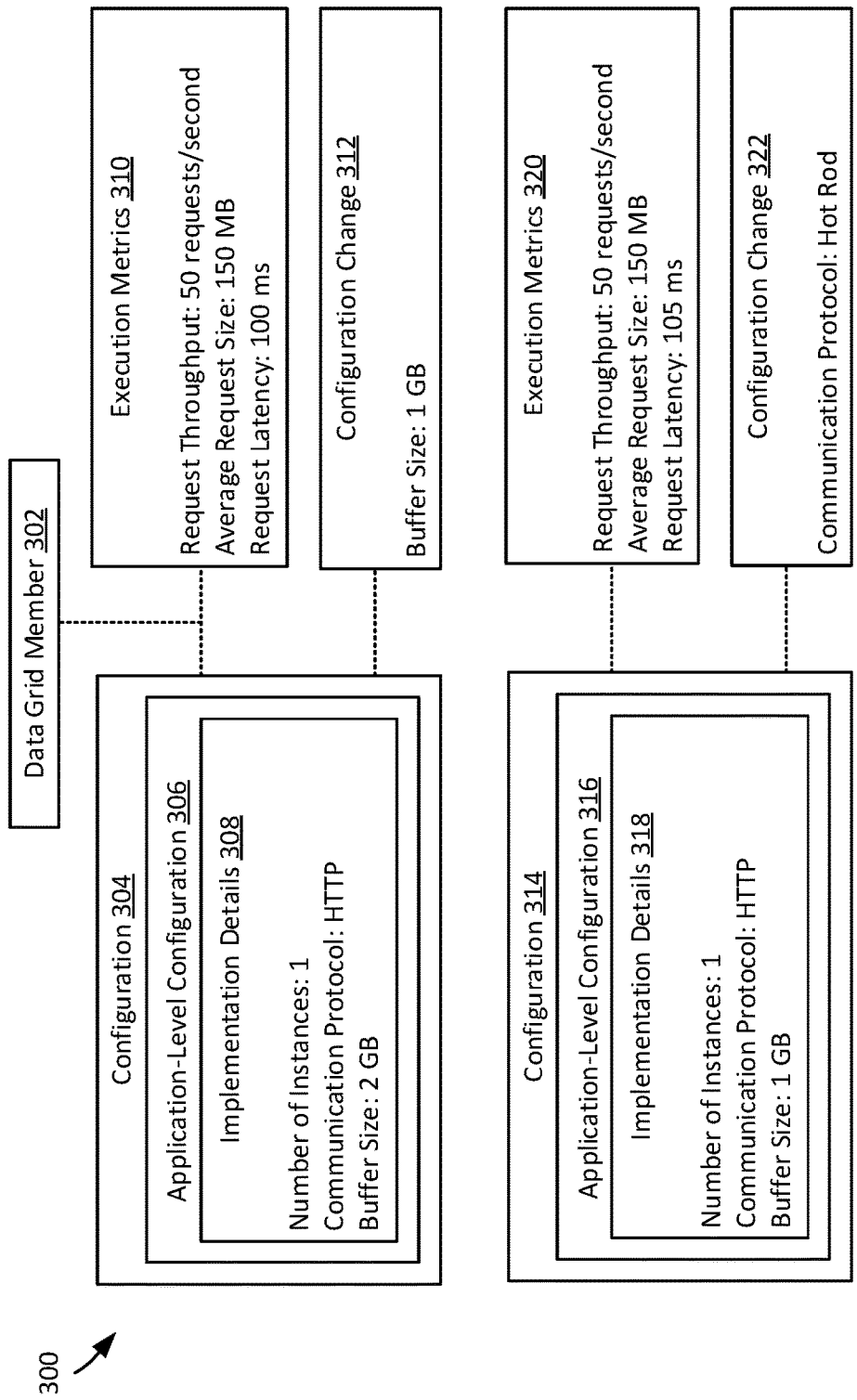
FIGS. 3A-3B illustrate operations to generate an updated configuration according to an exemplary embodiment of the present disclosure.
Figure 3B:
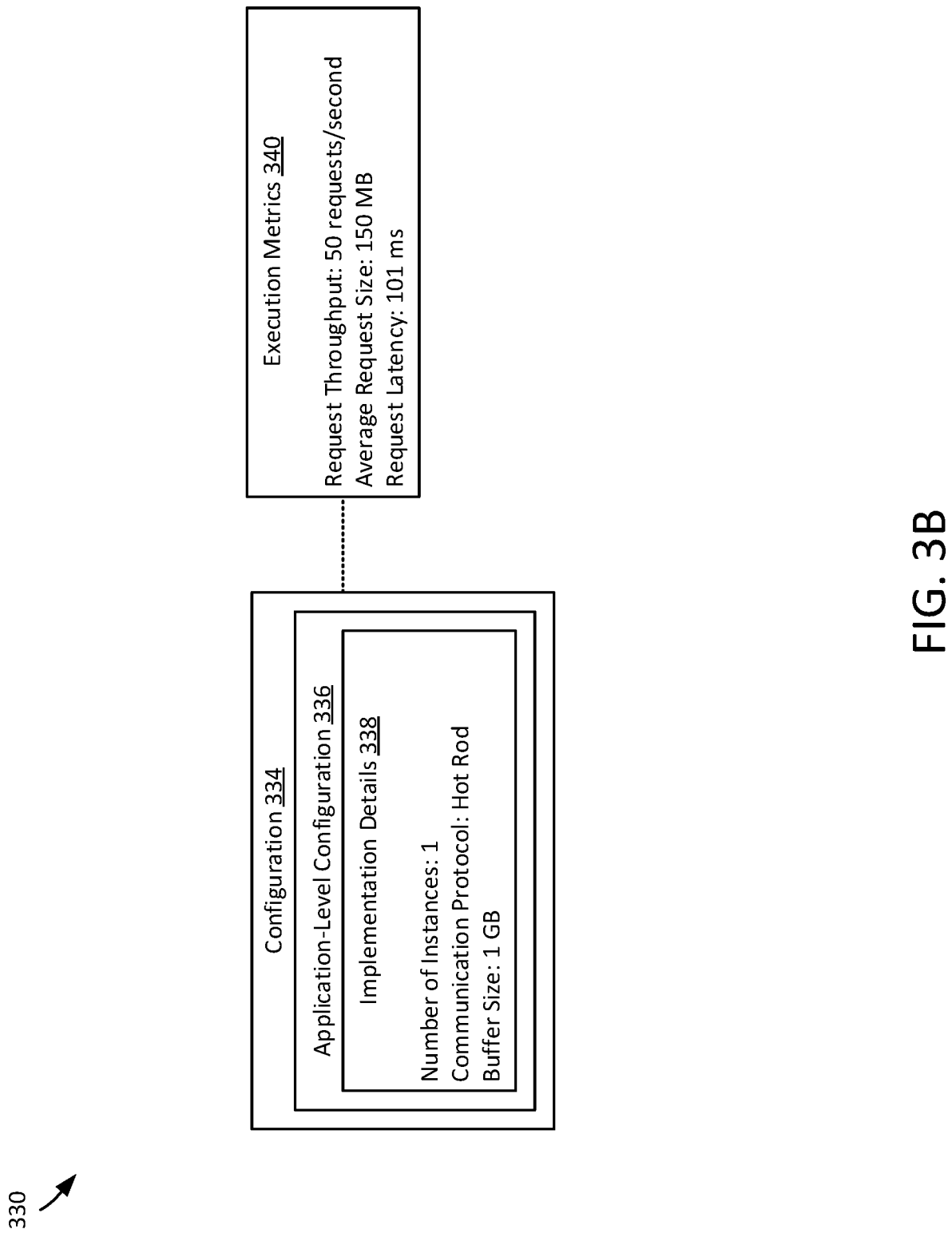

FIGS. 3A-3B illustrate operations 300, 330 to generate an updated configuration 146 according to an exemplary embodiment of the present disclosure. The operations 300, 330 may be performed to update a configuration of an application implementing a data grid member 302 that is executing in a computing environment. In particular, the operation 300 may be performed to update the configuration 304 of the data grid member 302. The data grid member 302 may be a member of a data grid configured to store data in a distributed fashion across multiple members. All or part of the members of the data grid may be implemented as applications executing within computing environments (e.g., the same computing environment, different computing environments). Accordingly, in certain implementations, the data grid may in practice function as a distributed database, and the members may store duplicate and/or overlapping copies of the data included within the data grid. During operation, data grid members may use different communication protocols to communicate with one another. For example, data grid members 302 may communicate using the hypertext transfer protocol (HTTP) and/or the Hot Rod protocol from Red Hat®. Data grid members may also include buffers (e.g., read/write buffers), which may vary in size. For example, where the data grid member 302 receives and/or transmits a large volume of requests (e.g., requests to store and/or access data), a larger buffer size may be required to ensure proper performance and avoid undue increases in latency. However, where the data grid member 302 does not receive or transmit many requests, a smaller buffer size may be superior, e.g., to reserve computing resources within the computing environment for use by other applications.

The configuration 304 of the data grid member 302 includes an application-level configuration 306 that indicates that one instance of the data grid is executing. For example, only the data grid member 302 within a particular computing environment. The application-level configuration 306 also indicates that the data grid member 302 is using the HTTP communication protocol and that the data grid member 302 has a buffer size of 2 GB. The execution metrics 310 indicates that the data grid member 302 is receiving 50 requests per second, and that the average request size of received request is 150 MB. The execution metrics 310 further indicates that the average request latency is 100 ms. In practice, a buffer size of 2 GB may not be necessary to service the volume of requests indicated in the execution metrics 310. For example, based on the training, the model 126 may determine that data grid members under similar request loads may have achieved similar request latencies with smaller buffer sizes. Accordingly, a configuration change 312 may be identified for a smaller buffer size of 1 GB.

The configuration change 312 may be incorporated into an updated configuration 314 for the data grid member 302. As depicted, the application-level configuration 316 for the configuration 314 includes implementation details 318 specifying a buffer size of 1 GB, one instance of the data grid member 302, and an HTTP communication protocol. The data grid member 302 may then be executed according to the configuration 314 to collect additional execution metrics 320. The execution metrics 320 indicate a similar request throughput of 50 requests per second and a similar average request size of 150 MB, and the request latency is increased only slightly to 105 ms. The model 126 may further determine another configuration change 322. For example, the model 126 may generate the configuration change 322 to change the communication protocol from HTTP to Hot Rod.

As shown in the operations 330, the configuration change 322 may then be applied to generate a further configuration 334 including an application-level configuration 336 and implementation details 338 that include a communication protocol of Hot Rod. The data grid member 302 may then be executed according to the further configuration and execution metrics 340 may be measured. As reflected in the execution metrics 340, the configuration change 322 improve the request latency from 105 ms to 101 ms. This process may repeat multiple times to generate multiple configurations with multiple associated execution metrics.

In particular, in certain instances, configuration changes may result in worse performance of the application 114.

In certain implementations, the configuration changes 312 may be selected by the model 126 based on similar configurations seen during training of the model 126. For example, as discussed above, the configuration 312 may be identified based on similar configurations seen during training that utilized a smaller buffer size to service similar request loads. Additionally or alternatively, the configuration changes 312, 322 may be selected based on a predetermined configuration space. For example, the predetermined configuration space may include a listing of the configuration settings for configurations of an application, along with valid configuration values (e.g., predetermined ranges of values) for the settings. In particular, the predetermined configurations space may be a database of pairings between configuration settings and valid configuration values. As a specific example, the predetermined configuration space for the data grid member may identify the number of instances, the communication protocol, and the buffer size as configuration settings that may include within a configuration change 312, 322. In addition, the predetermined configuration space may specify that the number of instances can have values of 1-30, the communication protocol can include HTTP or Hot Rod, and/or that the buffer size can be from 1-4 GB. In practice, the predetermined configuration space may include many configuration settings for use in adjusting the configuration of applications. In certain implementations, the predetermined configuration space may not include all configuration settings, e.g., because certain configuration settings may not be changed automatically by the model 126. In further implementations, the predetermined configuration space may be received from users such as creators of the application, individuals with experience deploying the application, and/or a user requesting execution of the application. In still further implementations, the predetermined configuration space may be derived from documentation of the application that specifies or explains the configuration settings of the application.

As depicted, the configurations 304, 314, 334 only include application level configurations 306, 316, 336. Additionally, the application-level configurations 306, 316, 336 only include implementation details 308, 318, 338. It should be understood that, in practice, the configurations 304, 314, 324 may include additional information, such as a system-level configuration, required system resources, and/or additional parameters within the implementation details 308, 318, 338.

Figure 4:
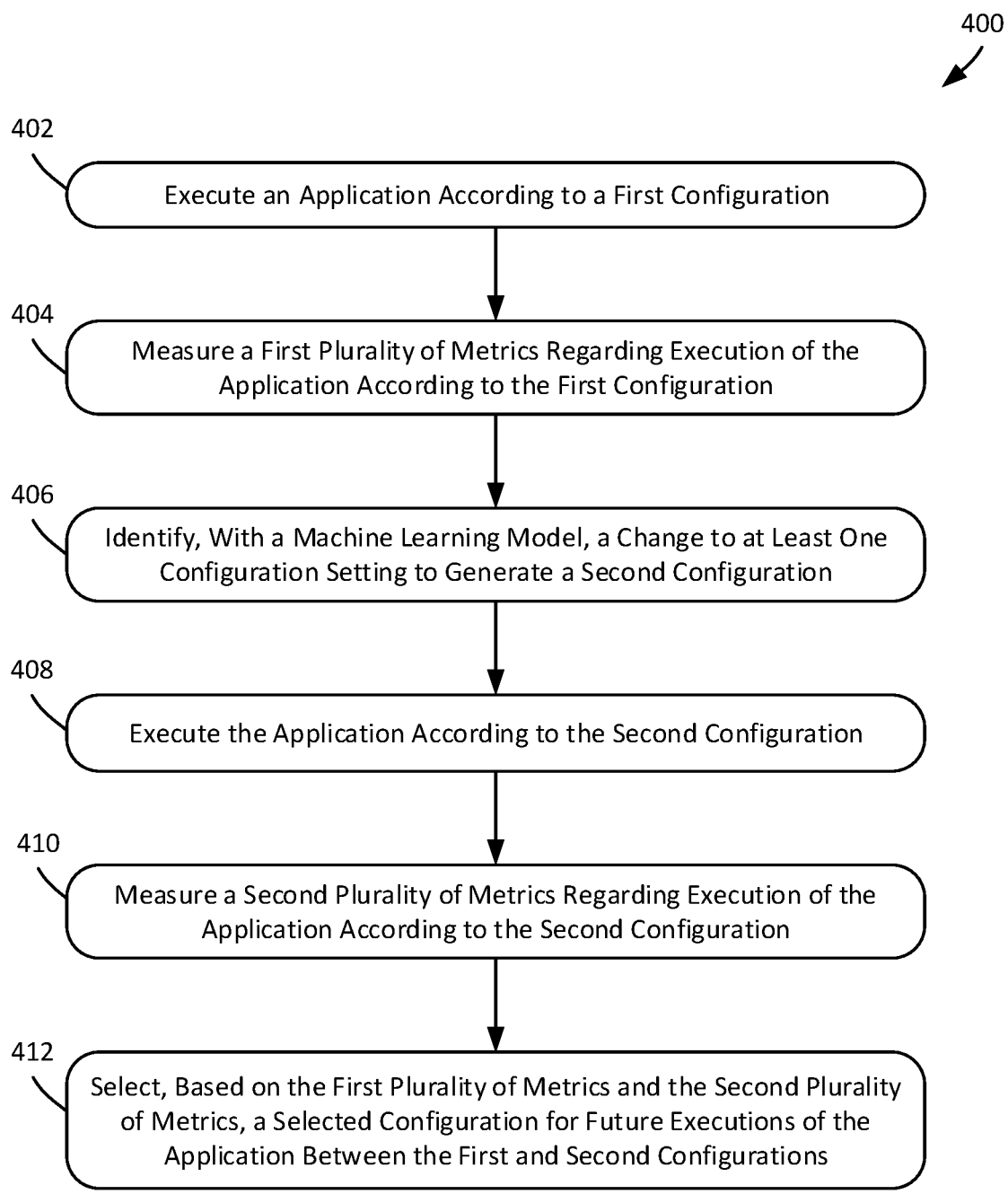
FIG. 4 illustrates a flowchart of a method for testing and selecting efficient configurations according to an exemplary embodiment of the present disclosure.

FIG. 4 illustrates a flow chart of a method 400 for testing and selecting configurations for applications according to an exemplary embodiment of the present disclosure. The method 400 may be implemented on a computer system, such as the computing environment 100 and/or the testing environment 150. The method 400 may also be implemented by a set of instructions stored on a computer-readable medium that, when executed by a processor, cause the processor to perform the method 400. For example, all or part of the method 400 may be implemented by the processor(s) 142, 170 and the memories 144, 172. Although the examples below are described with reference to the flowchart illustrated in FIG. 4, many other method of performing the acts associated with FIG. 4 may be used. For example, the order of some of the blocks may be changed, certain blocks may be combined with other blocks, one or more of the blocks may be repeated, and some of the blocks described may be optional.

The method 400 may begin with executing an application according to a first configuration (block 402). For example, the computing environment 100 may execute the application 114 according to a first configuration 108. The first configuration 108 may be selected by the operator service 106. For example, the model 126 of the operator service 106 may select the first configuration 108 for execution of the application 114. Additionally or alternatively, the first configuration 108 may be selected as a default configuration of the application 114 and/or as a configuration 108 received from a user requesting execution of the application 114. Where the model 126 selects the first configuration 108, the first configuration 108 may be selected based on training of the model 126 (e.g., training of the model within the testing environment 150).

A first plurality of metrics may be measured regarding execution of the application according to the first configuration (block 404). For example, the metrics service 104 may measure execution metrics 120 regarding execution of the application 114 according to the first configuration 108. The execution metrics 120 measured during execution of the application 114 may be predetermined. For example, particular metrics (e.g., key performance metrics) may be specified as most relevant and/are most critical to proper performance of the application 114. As a specific example, the metrics measured in the execution metrics 310, 320, 340 (e.g., the request throughput, the average request size, and the request latency) may be specified by a user (e.g., a user that is the same or similar to a user providing the predetermined configuration space discussed above).

A change may be identified, with a machine learning model, to at least one configuration setting to generate a second configuration (block 406). For example, a model 126 may identify a configuration change 132 to a configuration setting 134. When the configuration setting 134 is applied to the first configuration 108, an updated configuration 146 may be generated. For example, to identify the configuration change 132, the model 126 may select the configuration setting 134 for among a predetermined configuration space. For example, the model 126 may select a particular setting of the first configuration 108 to be changed, along with an updated value for the selected setting to determine the configuration setting 134. As discussed above, the particular setting and/or the value may be selected to comply with constraints specified by the predetermined configuration space (e.g., constraints on the particular settings that may be changed and/or acceptable values for change settings). In certain instances, the configuration setting 134 may be selected based on training of the model 126 (e.g., training of the model within the testing environment 150). In other instances, the configuration setting 134 may be selected to test additional, alternative configurations of the application 114. For example, in certain instances, the model 126 may iteratively alter one or more configuration settings to further test alternative configurations for the application 114.

The application may be executed according to the second configuration (block 408). For example, the configuration 110A may represent the updated configuration 146. The computing environment 100 may execute the application 114 according to the second configuration 110A. A second plurality of metrics regarding execution of the application according to the second configuration may be measured (block 410). For example, the metrics service 104 may measure execution metrics 122A regarding execution of the application 114 according to the second configuration 110A. Blocks 408, 410 may be executed similar to blocks 402, 404 discussed above.

A selected configuration may be selected between the first configuration and the second configuration based on the first plurality of metrics and the second plurality of metrics (block 412). For example, the operator service 106 and/or the computing environment 100 may select the selected configuration. The selected configuration may be selected between the first configuration 108 and the second configuration 110A. In particular, the selected configuration may be selected based on the execution metrics 120, 122A. In certain implementations, the selected configuration may be selected as the configuration with the highest level of performance. For example, the selected configuration may be selected based on execution metrics 120, 122A indicating greater performance under heavy workloads and/or minimal latencies. Additionally or alternatively, the selected configuration may be selected to be the configuration with lower resource utilization. For example, the selected configuration may be selected based on execution metrics 120, 122A indicating lower usage of processing power, memory, and/or storage space. In still further implementations, the selected configuration may be selected to balance workload performance and resource utilization. For example, the selected configuration may be selected based on a current load of the application 114, such as a current load as measured by the execution metrics 120, 122A (e.g., a current request throughput, current network conditions, current resource availability within the computing environment 100). Once selected, the selected configuration may be utilized for future executions of the application 114, including future executions of the application 114 for the current deployment and/or for future executions of the application 114 for future deployments, including deployments within other computing environments. In particular, the selected configuration may be utilized for future executions of the application 114 with similar loads as measured by future execution metrics (e.g., a similar request throughput, similar network conditions, similar resource availability within the computing environment 100).

Blocks 406-410 may, in certain implementations, be repeated multiple times to generate multiple configurations and measure multiple corresponding execution metrics. In such implementations, at block 412, the selected configuration may be selected between the multiple configurations based on the multiple execution metrics. In still further implementations one or more of the first configuration, the second configuration, and any other configurations generated while performing the method 400 may be used to further train the model 126. For example, model parameters 168 of the model 126 may be updated based on additional features (e.g., additional correlations between particular settings within the predetermined configuration space and/or particular setting values with certain execution metrics). In this way, the method 400 may enable the model 126 to determine over time which types of configuration settings are best suited to particular deployments and/or to optimizing particular execution metrics.

Further, because the method 400 allows the model 126 to test additional configurations outside of the previously-identified configurations 152 used to train the model 126, the method 400 enables the model 126 to avoid limitations imposed by limited and/or incomplete training sets of previously-identified configurations 152. Accordingly, over time, the accuracy of the updated configurations 146 generated by the operator service 106 will improve, even if training of the model 126 is limited. In particular, in certain instances, because the method 400 enables the model 126 to incorporate tested configurations during actual deployment of applications within the computing environment 100, the model 126 may not need to be initially trained to begin generating and testing configurations for applications 114. Additionally, by automatically testing, identifying, and applying improved configurations, the method 400 may enable improved performance for applications that are executing within the computing environment 100 (e.g., may improve responsiveness, execution speed, and/or may reduce overall resource utilization, freeing up additional resources for use in executing other applications).

Figure 5:
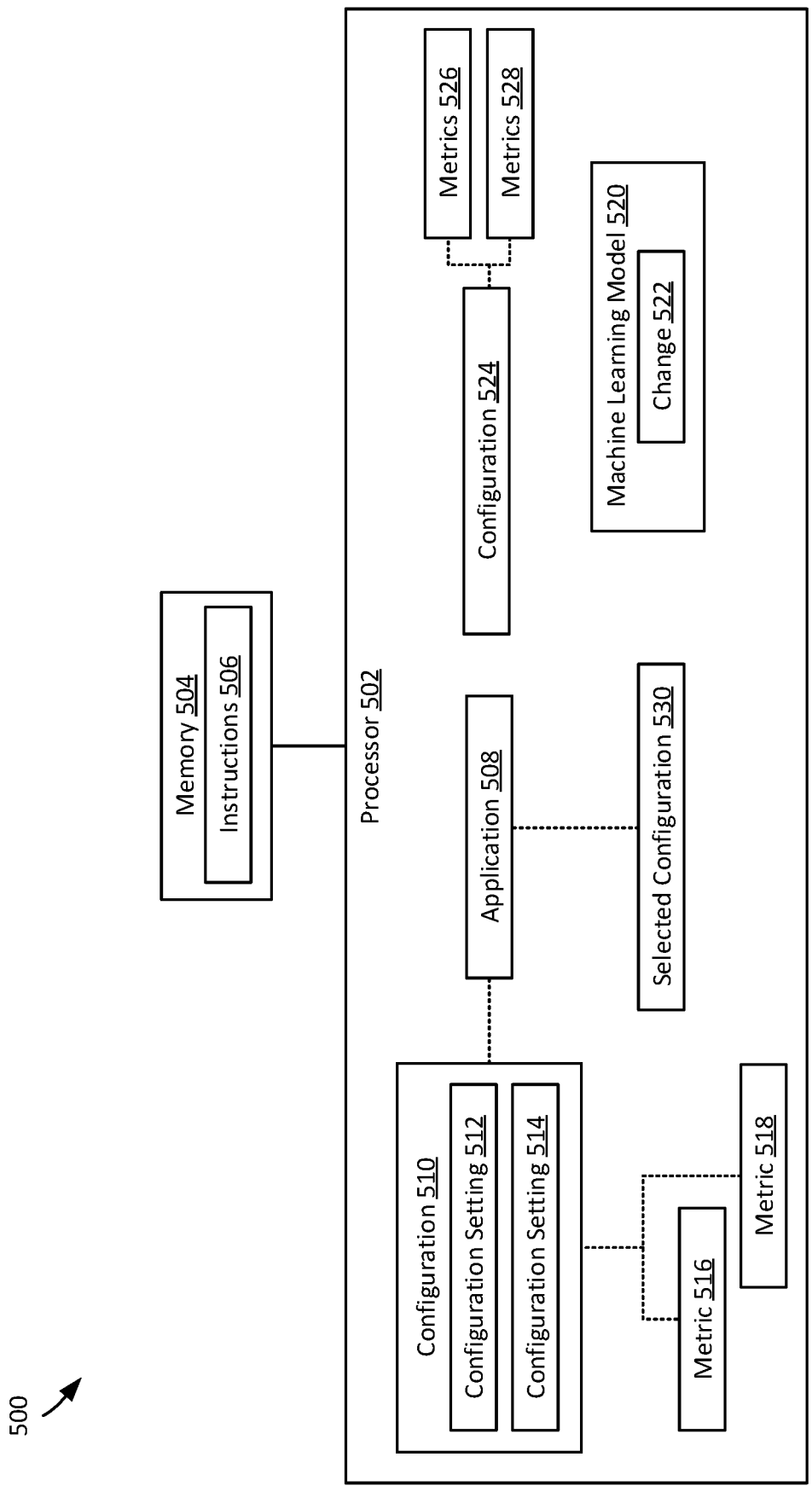
FIG. 5 illustrates a system according to an exemplary embodiment of the present disclosure.

FIG. 5 illustrates a system 500 according to an exemplary embodiment of the present disclosure. The system 500 includes a processor 502 and a memory 504. The memory 504 stores instructions 506. When executed by the processor 502, the instructions 506 cause the processor 502 to execute an application 508 according to a first configuration 510. The first configuration may include a plurality of configuration settings 512, 514. The processor 502 may also measure a first plurality of metrics 516, 518 regarding the execution of the application 508 according to the first configuration 510. The processor 502 may further identify, with a machine learning model 520, a change 522 to at least one configuration setting 512 to generate a second configuration 524 and execute the application 508 according to the second configuration 524. The instructions 506 may further cause the processor 502 to measure a second plurality of metrics 526, 528 regarding execution of the application 508 according to the second configuration 524 and select a selected configuration 530 for future executions of the application 508. The selected configuration 530 may be selected from among the first configuration 510 and the second configuration 524 based on the first plurality of metrics 516, 518 and the second plurality of metrics 526, 528.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
    executing an application according to a first configuration, the first configuration including a plurality of configuration settings, the execution of the application according to the first configuration associated with a first plurality of metrics;
    identifying, with a machine learning model, one or more changes to the plurality of configuration settings to generate one or more new configurations,
    wherein the machine learning model is trained to identify each change of the one or more changes using training data including: a plurality of previously identified configurations, a plurality of previously identified operating metrics corresponding to the previously identified configurations, and a plurality of previously identified configuration settings of the previously identified configurations,
    wherein the previously identified configurations comprise one or more implementation details and required system resources for previously identified applications, wherein the previously identified configuration settings comprise one or more parameters for the one or more implementation details and required system resources, and wherein the previously identified operating metrics indicate performance of the applications; and
    selecting, among the one or more new configurations, a second configuration for future executions of the application, wherein the selection is based on the first plurality of metrics and a second plurality of metrics associated with an execution of the application according to the second configuration.

2. The method of claim 1, further comprising:
    iterating the identifying to generate a plurality of new configurations, wherein selecting the second configuration comprises selecting among the plurality of new configurations.

3. The method of claim 1, wherein the plurality of configuration settings are identified based on a predetermined configuration space.

4. The method of claim 3, wherein the one or more changes to the plurality of configuration settings are selected to comply with a predefined range of values associated with the plurality of configuration settings within the predetermined configuration space.

5. The method of claim 1, further comprising:
    receiving the training data comprising the plurality of previously identified configurations, the plurality of previously identified operating metrics corresponding to the previously identified configurations, and the plurality of previously identified configuration settings of the previously identified configurations; and
    training the machine learning model using the training data.

6. The method of claim 1, further comprising:
    receiving the application for execution within a computing environment; and
    monitoring a plurality of executed configurations for the application during execution with the computing environment,
    wherein the previously-identified configurations includes at least a subset of the plurality of executed configurations.

7. The method of claim 6, wherein the previously-identified configurations includes at least one configuration identified by the machine learning model for a previous execution of the application.

8. The method of claim 1, wherein the application is executed in a first computing environment, and wherein the method further comprises, prior to executing in the first computing environment,
    executing, within a second computing environment, the application a plurality of times according to a plurality of testing configurations, wherein the previously-identified configurations includes at least a subset of the plurality of testing configurations.

9. The method of claim 1, wherein the first configuration further includes a system-level configuration specifying an amount of one or more system resources available for execution of a function, and wherein the one or more changes to the plurality of configuration settings are identified at least in part based on the system-level configuration.

10. The method of claim 1, wherein the machine learning model is implemented by a neural network model.

11. The method of claim 1, wherein the metrics include at least one of a latency of the application, a throughput of the application, a processor utilization of the application, a memory utilization of the application, and a storage utilization of the application.

12. A system comprising:
a processor; and
a memory storing instructions which, when executed by the processor, cause the processor to:
execute an application according to a first configuration, the first configuration including a plurality of configuration settings, the execution of the application according to the first configuration associated with a first plurality of metrics;
identify, with a machine learning model, one or more changes to the plurality of configuration settings to generate one or more new configurations,
wherein the machine learning model is trained to identify each change of the one or more changes using training data including: a plurality of previously identified configurations, a plurality of previously identified operating metrics corresponding to the previously identified configurations, and a plurality of previously identified configuration settings of the previously identified configurations,
wherein the previously identified configurations comprise one or more implementation details and required system resources for previously identified applications, wherein the previously identified configuration settings comprise one or more parameters for the one or more implementation details and required system resources, and wherein the previously identified operating metrics indicate performance of the applications; and
select, among the one or more new configurations, a second configuration for future executions of the application, wherein the selection is based on the first plurality of metrics and a second plurality of metrics associated with an execution of the application according to the second configuration.

13. The system of claim 12, wherein the instructions, when executed by the processor, further cause the processor to:
iterate the identifying to generate a plurality of new configurations, wherein selecting the second configuration comprises selecting among the plurality of new configurations.

14. The system of claim 12, wherein the plurality of configuration settings are identified based on a predetermined configuration space.

15. The system of claim 14, wherein the one or more changes to the plurality of configuration settings are selected to comply with a predefined range of values associated with the plurality of configuration settings within the predetermined configuration space.

16. The system of claim 12, wherein the instructions, when executed, further cause the processor to:

receive the training data comprising the plurality of previously identified configurations, the plurality of previously identified operating metrics corresponding to the previously identified configurations, and the plurality of previously identified configuration settings of the previously identified configurations; and
train the machine learning model using the training data to identify the one or more changes.

17. The system of claim 12, wherein the instructions, when executed, further cause the processor to:
receive the application for execution within a computing environment; and
monitor a plurality of executed configurations for the application during execution with the computing environment,
wherein the previously-identified configurations includes at least a subset of the plurality of executed configurations.

18. The system of claim 12, wherein the application is executed in a first computing environment, and wherein the instructions, when executed by the processor, further cause the processor to, prior to executing in the first computing environment:
execute, within a second computing environment, the application a plurality of times according to a plurality of testing configurations, wherein the previously-identified configurations includes at least a subset of the plurality of testing configurations.

19. The system of claim 12, wherein the first configuration further includes a system-level configuration specifying an amount of one or more system resources available for execution of a function, and wherein the one or more changes to the plurality of configuration settings are identified at least in part based on the system-level configuration.

20. A non-transitory, computer-readable medium storing instructions which, when executed by a processor, cause the processor to:
execute an application according to a first configuration, the first configuration including a plurality of configuration settings, the execution of the application according to the first configuration associated with a first plurality of metrics;
identify, with a machine learning model, one or more changes to the plurality of configuration settings to generate one or more new configurations,
wherein the machine learning model is trained to identify each change of the one or more changes using training data including: a plurality of previously identified configurations, a plurality of previously identified operating metrics corresponding to the previously identified configurations, and a plurality of previously identified configuration settings of the previously identified configurations,
wherein the previously identified configurations comprise one or more implementation details and required system resources for previously identified applications, wherein the previously identified configuration settings comprise one or more parameters for the one or more implementation details and required system resources, and wherein the previously identified operating metrics indicate performance of the applications; and
select, among the one or more new configurations, a second configuration for future executions of the application, wherein the selection is based on the first plurality of metrics and a second plurality of metrics associated with an execution of the application according to the second configuration.

* * * * *